(12) United States Patent
Shoor et al.

(10) Patent No.: US 10,673,774 B2
(45) Date of Patent: Jun. 2, 2020

(54) LOW LATENCY RE-TIMER

(71) Applicant: Intel Corporation, Santa Clara, CA (US)

(72) Inventors: Ehud Udi Shoor, Haifa (IL); Ari Sharon, Kfar Uria (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/140,332

(22) Filed: Sep. 24, 2018

(65) Prior Publication Data

US 2019/0028398 A1    Jan. 24, 2019

Related U.S. Application Data

(63) Continuation of application No. 15/465,396, filed on Mar. 21, 2017, now Pat. No. 10,129,166.

(60) Provisional application No. 62/352,928, filed on Jun. 21, 2016.

(51) Int. Cl.
| | |
|---|---|
| *H04L 25/03* | (2006.01) |
| *H04L 12/863* | (2013.01) |
| *H04L 1/00* | (2006.01) |
| *G06F 13/40* | (2006.01) |
| *G06F 1/04* | (2006.01) |
| *H04B 15/00* | (2006.01) |
| *H04L 12/861* | (2013.01) |

(52) U.S. Cl.
CPC ............ *H04L 47/6245* (2013.01); *G06F 1/04* (2013.01); *G06F 13/40* (2013.01); *H04B 15/00* (2013.01); *H04L 1/0018* (2013.01); *H04L 25/03273* (2013.01); *H04L 49/90* (2013.01)

(58) Field of Classification Search
CPC ....... H04B 15/00; H04L 49/90; H04L 1/0018; H04L 25/03273; H04L 47/6245; H04L 12/42; H04L 47/13
USPC ................. 375/130, 219–222, 354–356, 372
See application file for complete search history.

(56) References Cited

U.S. PATENT DOCUMENTS

| | | | |
|---|---|---|---|
| 4,694,472 A | 9/1987 | Torok et al. | |
| 5,802,358 A * | 9/1998 | Konomi | H04J 3/062 713/503 |
| 6,064,688 A * | 5/2000 | Yanagi | H04B 1/7075 375/142 |
| 7,130,368 B1 | 10/2006 | Aweya | |

(Continued)

OTHER PUBLICATIONS

Non-Final Office Action for U.S. Appl. No. 15/465,396, dated Sep. 28, 2017.

(Continued)

*Primary Examiner* — Emmanuel Bayard
(74) *Attorney, Agent, or Firm* — Green, Howard & Mughal LLP

(57) ABSTRACT

Described is a low latency re-timer for systems supporting spread spectrum clocking. The re-timer comprises: a first clock frequency estimator to estimate a frequency of a receive clock (RX CLK) and to provide a first timestamp associated with a first clock that underwent spread spectrum; a second clock frequency estimator to estimate a frequency of a transmit clock (TX CLK) and to provide a second timestamp associated with a second clock that underwent spread spectrum; and a comparator to compare the first timestamp with the second timestamp.

20 Claims, 11 Drawing Sheets

(56) References Cited

U.S. PATENT DOCUMENTS

| | | | |
|---|---|---|---|
| 7,505,542 B1* | 3/2009 | Lesea | H03C 3/09 |
| | | | 327/151 |
| 8,831,064 B1* | 9/2014 | Kaviani | H04B 15/04 |
| | | | 375/132 |
| 9,880,949 B1 | 1/2018 | Hanchinal | |
| 10,129,166 B2* | 11/2018 | Shoor | H04L 47/6245 |
| 2001/0022823 A1 | 9/2001 | Renaud | |
| 2004/0263427 A1* | 12/2004 | Horigan | G09G 5/008 |
| | | | 345/3.1 |
| 2005/0066142 A1 | 3/2005 | Bhattacharya et al. | |
| 2005/0169355 A1 | 8/2005 | Amirichimeh | |
| 2007/0002893 A1* | 1/2007 | Neff | H03M 9/00 |
| | | | 370/465 |
| 2007/0222528 A1* | 9/2007 | Pernia | H03L 1/022 |
| | | | 331/44 |
| 2009/0059962 A1 | 3/2009 | Schmidt | |
| 2009/0147827 A1* | 6/2009 | Holmquist | G06F 1/08 |
| | | | 375/130 |
| 2009/0190701 A1 | 7/2009 | Nekhamkin | |
| 2011/0188551 A1 | 8/2011 | Shin | |
| 2011/0191619 A1* | 8/2011 | Morrison | G11C 7/1012 |
| | | | 713/500 |
| 2011/0199138 A1 | 8/2011 | Sano | |
| 2011/0254848 A1* | 10/2011 | Bergland | G06T 1/20 |
| | | | 345/501 |
| 2012/0087418 A1 | 4/2012 | Zheng | |
| 2013/0249609 A1* | 9/2013 | Taki | H03L 7/089 |
| | | | 327/156 |
| 2014/0075235 A1* | 3/2014 | Chandhoke | H04J 3/0667 |
| | | | 713/401 |
| 2014/0082401 A1* | 3/2014 | Lee | G06F 1/08 |
| | | | 713/501 |
| 2014/0126613 A1 | 5/2014 | Zhang | |
| 2014/0328377 A1 | 11/2014 | Nakadaira | |
| 2015/0052379 A1* | 2/2015 | Shirai | G06F 1/08 |
| | | | 713/501 |
| 2016/0033891 A1* | 2/2016 | Abe | G03G 15/04054 |
| | | | 347/118 |
| 2017/0286359 A1 | 10/2017 | McGowan | |

OTHER PUBLICATIONS

Notice of Allowance for U.S. Appl. No. 15/465,396, dated May 29, 2018.

* cited by examiner

US 10,673,774 B2

LOW LATENCY RE-TIMER

CLAIM OF PRIORITY

This application is a Continuation of, and claims priority to U.S. patent application Ser. No. 15/465,396, filed 21 Mar. 2017, issued as U.S. Pat. No. 10,129,166, on 13 Nov. 2018, which claims priority of U.S. Provisional Application 62/352,928 filed 21 Jun. 2016, both of which are incorporated by reference in their entirety.

BACKGROUND

Re-timers are widely used in Universal Serial Bus (USB) type—C ecosystem. However, current re-timers suffer from high latency. Latency may cause quality of service (QoS) issues on one end of a performance spectrum to functional failures on another end of the performance spectrum.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
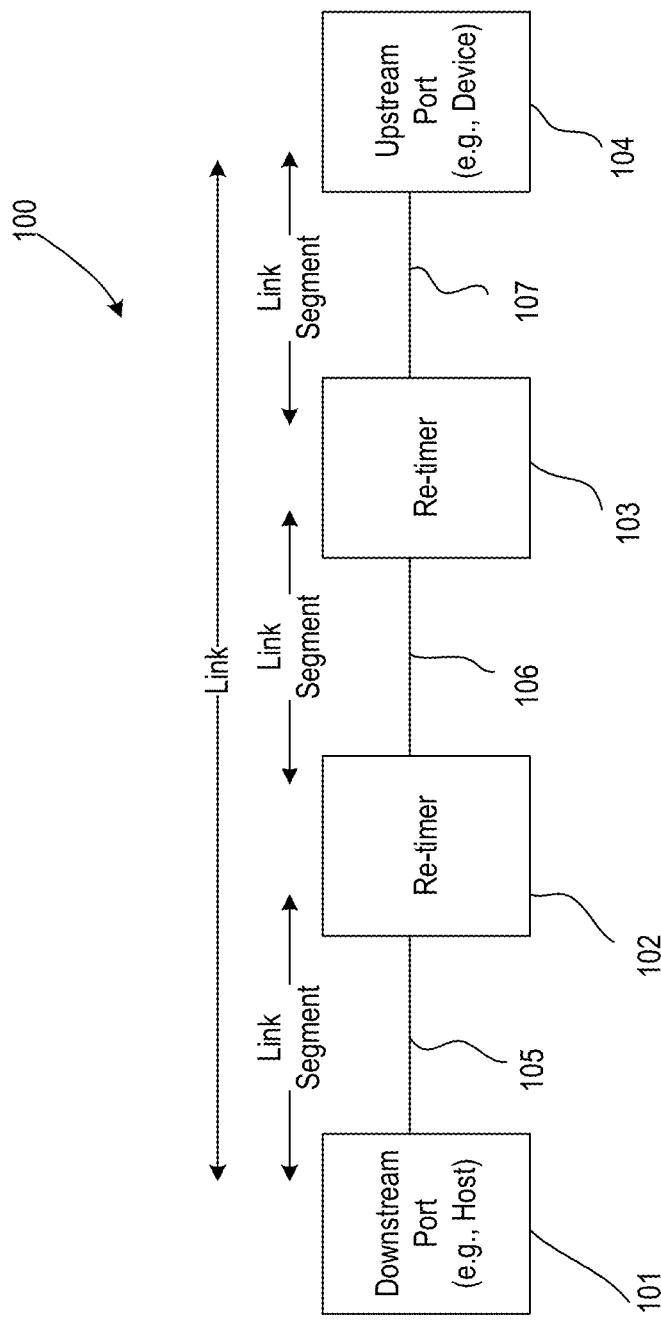
FIG. 1 illustrates a high-level link with low latency re-timers, according to some embodiments of the disclosure.

Universal Serial Bus (USB) Type-C ecosystem (and also Peripheral Component Interconnect Express (PCI-E) that uses separate Reference clock with Independent Spread (SRIS) mode, hereinafter referred to as (PCI-E SRIS)) includes re-timer devices placed between the host and the device for breaking the connection between the device and the host into smaller segments. As such, insertion loss assumptions are supposed to be met. For example, discrete re-timers are placed on motherboards and inside the plugs of Type-C active-cables to meet insertion loss. Re-timers in general receive signals on one side, recovering the data, and transmit the data on their other end. Various embodiments here are described with reference to re-timers used in a USB ecosystem. However, the embodiments are not limited to such. Any other communication interface that may use re-timers can also benefit from the low-latency timers of the various embodiments.

In some embodiments, a re-timer includes a receiver (RX), a FIFO (First-in-First-Out buffer), a transmitter (TX), a clock data recovery circuit (CDR), a transmitter phase locked loop (Tx PLL), and a Spread Spectrum Clocking (SSC) generator (SSC GEN). Signal for a host or device is received by the RX. The RX then provides Data to the FIFO using the RX clock (RX CLK). For example, RX CLK is used as a sampling clock to sample data into the FIFO. The TX then receives data from the FIFO using a TX CLK. For example, TX CLK is used as a sampling clock to sample out the data stored in the FIFO. The TX then outputs the data to the device/host. For example, the TX serializes the data and buffers it out. The CDR on the receiving side tracks incoming SSC waveform. For example, the CDR associated with the RX recovers a clock from the incoming data received by the RX. The SSC generator (SSC GEN) at the transmitter side generates the SSC waveform for the TX. These two waveforms are not synchronized. In one example, the instantaneous frequency difference might reach up to 5600 ppm (parts per million) on times when the receiver waveform is at +300 ppm and the TX waveform is at approximately 5300 ppm, or vice versa.

Specifically, in the current USB standard (and PCI-E) it is assumed that re-timers' transmitters will generate their clock locally (e.g., by a TX PLL) and may not use the recovered clock (e.g., CLK recovered from the CDR associated with the RX) for sending the data. In such cases, the frequency gap between the receive clock and the transmit clock is compensated by adding/dropping IDLE/SKIP ordered set symbols to the data stream. This clocking scheme uses the FIFO for passing the data from the receiver clock domain (e.g., writes to the FIFO) to the transmitter clock domain (e.g., reads from the FIFO). The delay used between the FIFO's write and read operations is determined by the frequency gap between the TX CLK and RX CLK and by the maximum time between IDLEs which allow to align back the sampling pointers that sample data to and from the FIFO.

In USB-C (and PCI-E SRIS) standards, each of the receiver and transmitter clocks needs to independently support SSC (e.g., the frequency is dynamically changing in a range of 0 ppm to −5000 ppm). In this example, when adding the allowed +/−300 ppm accuracy, the maximum frequency gap between the receiver and transmitter sides may reach up to 5600 ppm. Taking the worst case scenario of USB 3.1 Gent (5 Gb/s (giga-bit per second)) where the maximum payload packet is of 10560 bits, in which IDLEs cannot be added/deleted in the FIFO for frequency difference compensation, the associated re-timer FIFO latency is $5600 \times 1e^{-6} \times 1056 \times (1/5e^9) = 11.8$ ns (nanoseconds). Such added latency per re-timer may create failures for USB links as the round-trip latency becomes too high when several re-timers are included in the system.

Various embodiments describe an apparatus for a re-timer to reduce the dynamic frequency gap between the receiver and transmitter clocks, facilitating smaller FIFO latency. If, for example, the maximum frequency difference is 1000 ppm instead of 5600 ppm, then the latency will go down by the same ratio: 11.8 ns×1000/5600=2.1 ns. This can be obtained by implementing a tracking loop in the SSC waveform generator placed at the TX side, such that the dynamic frequency modulation used for the transmitter will follow the one of the receiver clock (recovered clock), according to some embodiments.

In some embodiments, when the two waveforms (e.g., the TX CLK and the RX CLK) are close enough in phase and frequency, the apparatus allows to switch to the recovered clock for the transmitter as well without causing any glitch in the system as the two clocks (e.g., RX CLK and TX CLK) will be almost identical before the switch. Note: using the recovered clock for the transmitter side right from the beginning may not be possible due to the USB standard requirements associated with power management exit assumptions and jitter amplification.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct physical, electrical, or wireless connection between the things that are connected, without any intermediary devices. The term "coupled" means either a direct electrical or wireless connection between the things that are connected or an indirect electrical or wireless connection through one or more passive or active intermediary devices. The term "circuit" means one or more passive and/or active components that are arranged to cooperate with one another to provide a desired function. The term "signal" means at least one current signal, voltage signal, magnetic signal, electromagnetic signal, or data/clock signal. The meaning of "a," "an," and "the" include plural references. The meaning of "in" includes "in" and "on."

The terms "substantially," "close," "approximately," "near," and "about," generally refer to being within +/−10% of a target value (unless specifically specified). Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," it, "front," "back," "top," "bottom," "over," "under," and the like in the description and in the claims, if any, are used for descriptive purposes and not necessarily for describing permanent relative positions.

FIG. 1 illustrates a high-level link 100 with low latency re-timers, according to some embodiments of the disclosure.

Link 100 comprises a Downstream Port 101 (e.g., a Host such as a processor based system, laptop, server, gaming device, etc.), Re-timers 102 and 103, and Upstream Port 104 (e.g., a device such as a camera). The various components (e.g., 101, 102, 103, and 104) of Link 100 are coupled together by link segments 105, 106, and 107 as shown. The following definitions may apply with respect to various embodiments.

The term "Repeater" of buffer may generally refer to any active component or circuitry that acts on a signal in order to increase the physical lengths and/or interconnect loss over which the signal can be transmitted successfully. The category of repeaters includes both re-timers and re-drivers.

The term "Re-timer" (or retimer) may generally refer to a component or circuitry that contains a clock-data recovery (CDR) circuit that "retimes" the signal. The retimer (e.g., Re-timer 102 and 103) latches the signal into a synchronous memory element before re-transmitting it. It is used to extend the physical length of the system without accumulating high frequency jitter by creating separate clock domains on either side of the retimer.

The term "Re-driver" may generally refer to an analog component or circuitry that operates on the signal without re-timing it. This may include equalization, amplification, and transmitter. The re-driver may not include a CDR, for example.

The term "Device captive retimer" may generally refer to a retimer that is located on the same printed circuit as the device silicon. The retimer is said to be associated with the device. For example, a retimer in Upstream port 104.

The term "Host captive retimer" may generally refer to a retimer that is located on the same printed circuit as the host silicon. In this case, the retimer is said to be associated with the host. For example, a retimer in Downstream port 101.

The term "Link segment" generally refers to a transmitter-channel-receiver combination between a downstream port 101 and a retimer 102, and upstream port 104 and retimer 103, or between two re-timers (e.g., 106 which is between 102 and 103).

In some embodiments, re-timers 102 and 103 comprises an RX, a FIFO, a TX, a CDR circuit, a Tx PLL, and a SSC GEN. In some embodiments, re-timers 102 and 103 comprise a first clock frequency estimator to estimate a frequency of a receive clock (RX CLK) and to provide a first timestamp associated with a first clock that underwent spread spectrum. In some embodiments, re-timers 102 and 103 comprise a second clock frequency estimator to estimate a frequency of a transmit clock (TX CLK) and to provide a second timestamp associated with a second clock that underwent spread spectrum. In some embodiments, re-timers 102 and 103 comprise a comparator to compare the first timestamp with the second timestamp. In some embodiments, re-timers 102 and 103 comprise a filter to receive an output of the comparator. In some embodiments, the SSC GEN modulates the TX CLK by adding spread spectrum clock on to it. In some embodiments, Tx PLL receives the modulated TX CLK, and generates the TX CLK. In some embodiments, the CDR circuit generates the RX CLK from incoming receive data. In some embodiments, data in the FIFO is entered using the RX CLK and data from the FIFO is read out using the TX CLK. This arrangement of various components/circuitries causes the TX CLK to be closely aligned in phase and frequency with the RX CLK, and as such latency of re-timers 102 and 103 reduces compared to traditional re-timers.

FIGS. 2A-D illustrate usage examples 200, 220, 230, and 240, respectively, of the low latency re-timer, according to some embodiments of the disclosure. It is pointed out that those elements of FIGS. 2A-D having the same reference numbers (or names) as the elements of any other figure can operate or function in any manner similar to that described, but are not limited to such. A retimer may be used on a printed circuit board (PCB) in conjunction with a host or device, or as part of a cable assembly. The USB usage model, which matches hosts, devices and cables at the time of usage, allows for the construction of systems that include re-timers on all three components. While the various examples here are illustrated with reference to differential signaling and associated circuits, the re-timers can also be used for single-ended signaling and circuitries.

Figure 2A:
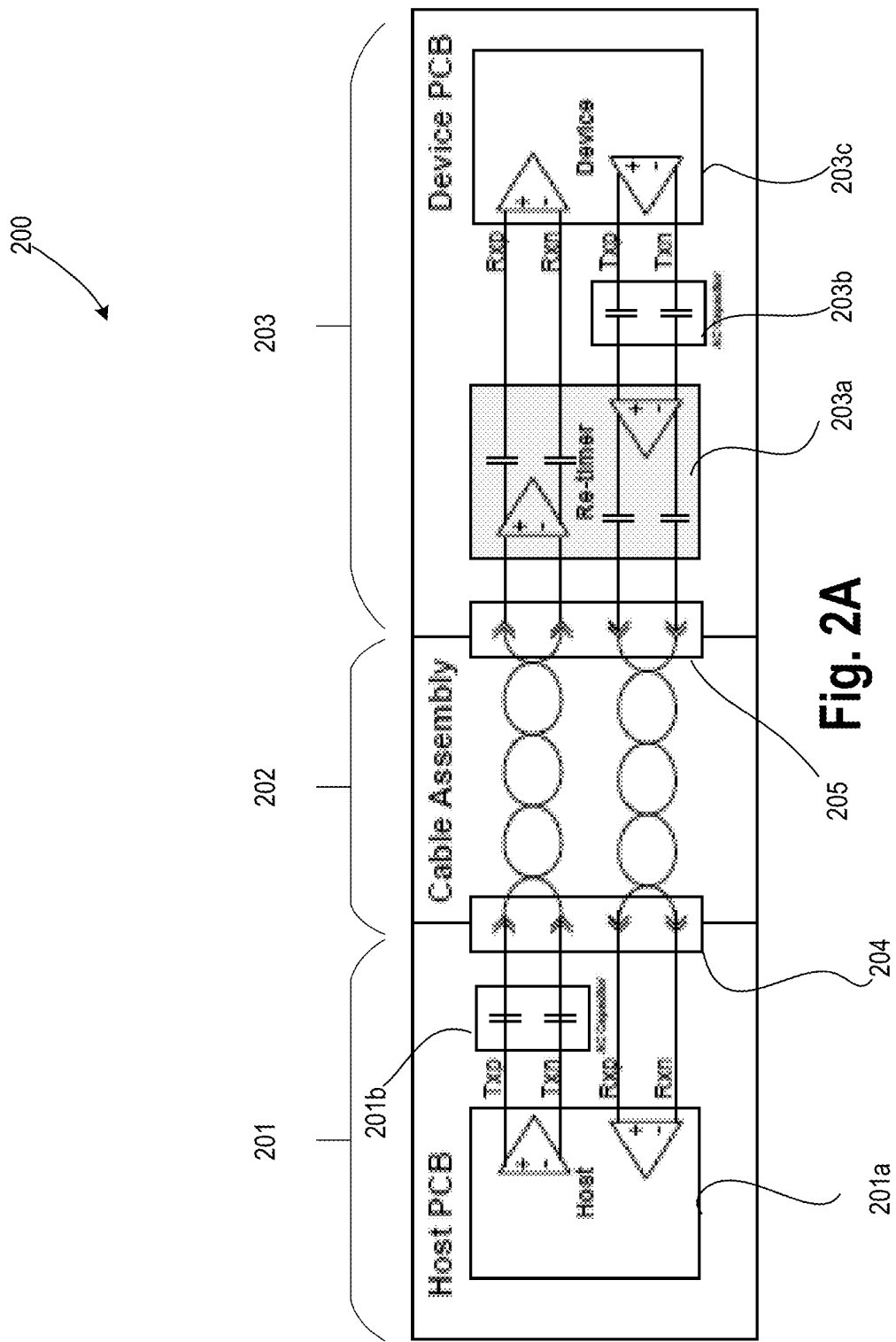
FIGS. 2A-D illustrate usage examples of the low latency re-timer, according to some embodiments of the disclosure.

FIG. 2A illustrates usage model 200 where the re-timer is part of a device PCB (e.g., Device captive retimer), according to some embodiments of the disclosure. Usage model 200 comprises Host PCB 201, Cable Assembly 202, Device PCB 203, interface 204 for coupling Host PCB 201 with Cable Assembly 202, and interface 205 for coupling the Cable Assembly 202 with Device PCB 203. In this example, Host PCB 201 includes the Host 201a (e.g., processor or system-on-chip (SOC)) having a transmitter (e.g., differential transmitter) that transmits Txp and Txn differential signals to Cable Assembly 202 via AC coupling capacitors 201b. Host PCB 201 also includes a receiver (e.g., differential receiver) that receives differential signals Rxp and Rxn from interface 204. Cable Assembly 202 may be any cable or transmission media that can carry signals with least losses possible. Cable Assembly can be USB, PCI-e, etc. compliant assembly. In this usage model, Device PCB 203 includes re-timer 203a, AC coupling capacitors 203b, and Device 203c (e.g., camera, display, etc.). In this example, re-timer 203a is a Device captive retimer.

Figure 2B:
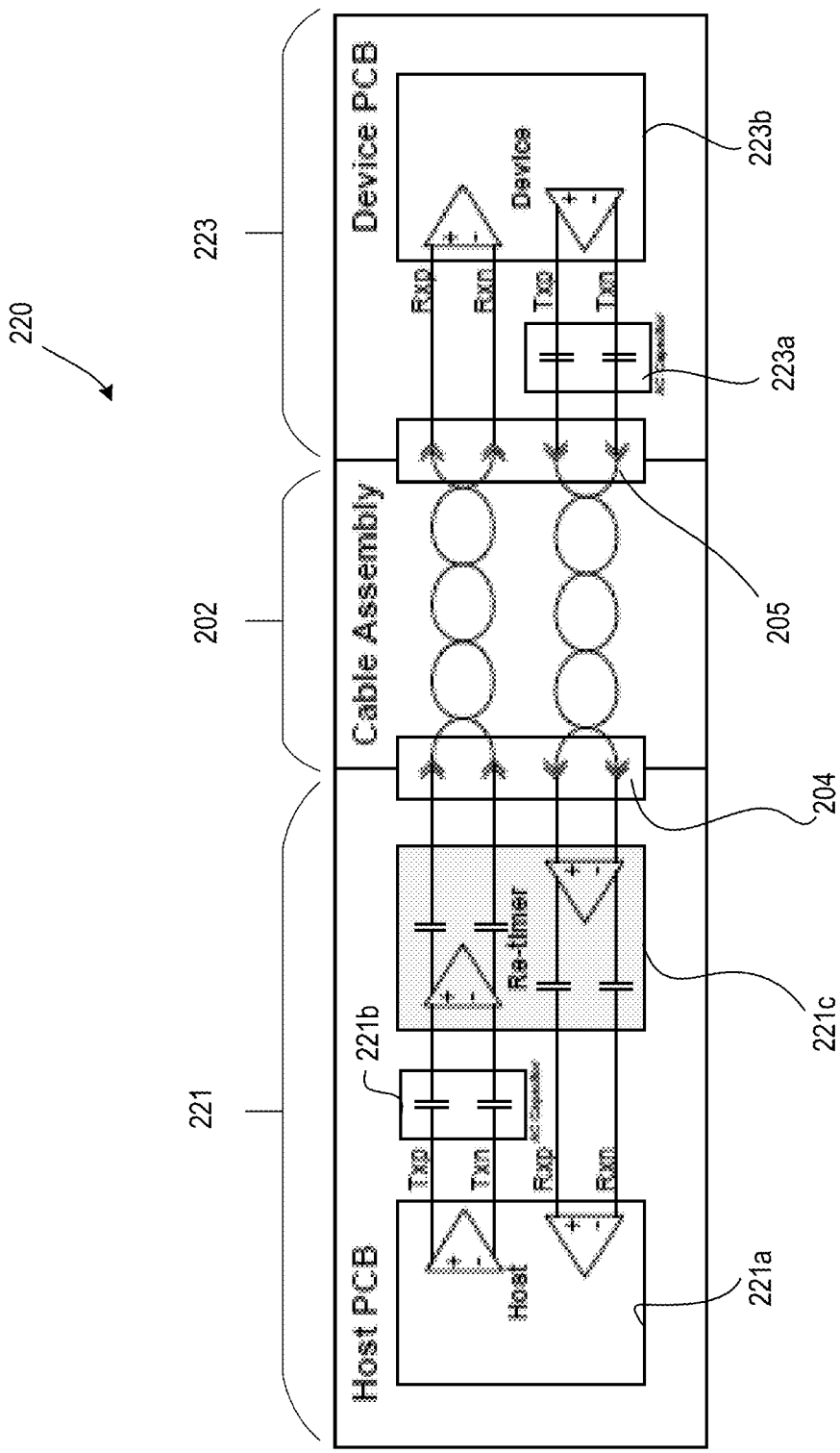

FIG. 2B illustrates usage model 220 where the re-timer 221c is part of a Host PCB 221 (e.g., Host captive retimer), according to some embodiments of the disclosure. Usage model 220 comprises Host PCB 221, Cable Assembly 202, Device PCB 223, interface 204 for coupling Host PCB 221 with Cable Assembly 202, and interface 205 for coupling Cable Assembly 202 with Device PCB 223. Host PCB 221 includes Host 221a (e.g., processor or system-on-chip (SOC)) having a transmitter (e.g., differential transmitter) that transmits Txp and Txn differential signals to re-timer 221c via AC coupling capacitors 221b. Host PCB 221 also includes a receiver (e.g., differential receiver) that receives differential signals Rxp and Rxn from interface 204 via re-timer 221c. Device PCB 223 may include device 223b which is configured to receive differential signals Rxp and Rxn via interface 205, and to transmit differential signals Txp and Txn to interface 205 via AC coupling capacitors 223a. In this example, re-timer 221c is a Host captive retimer.

Figure 2C:
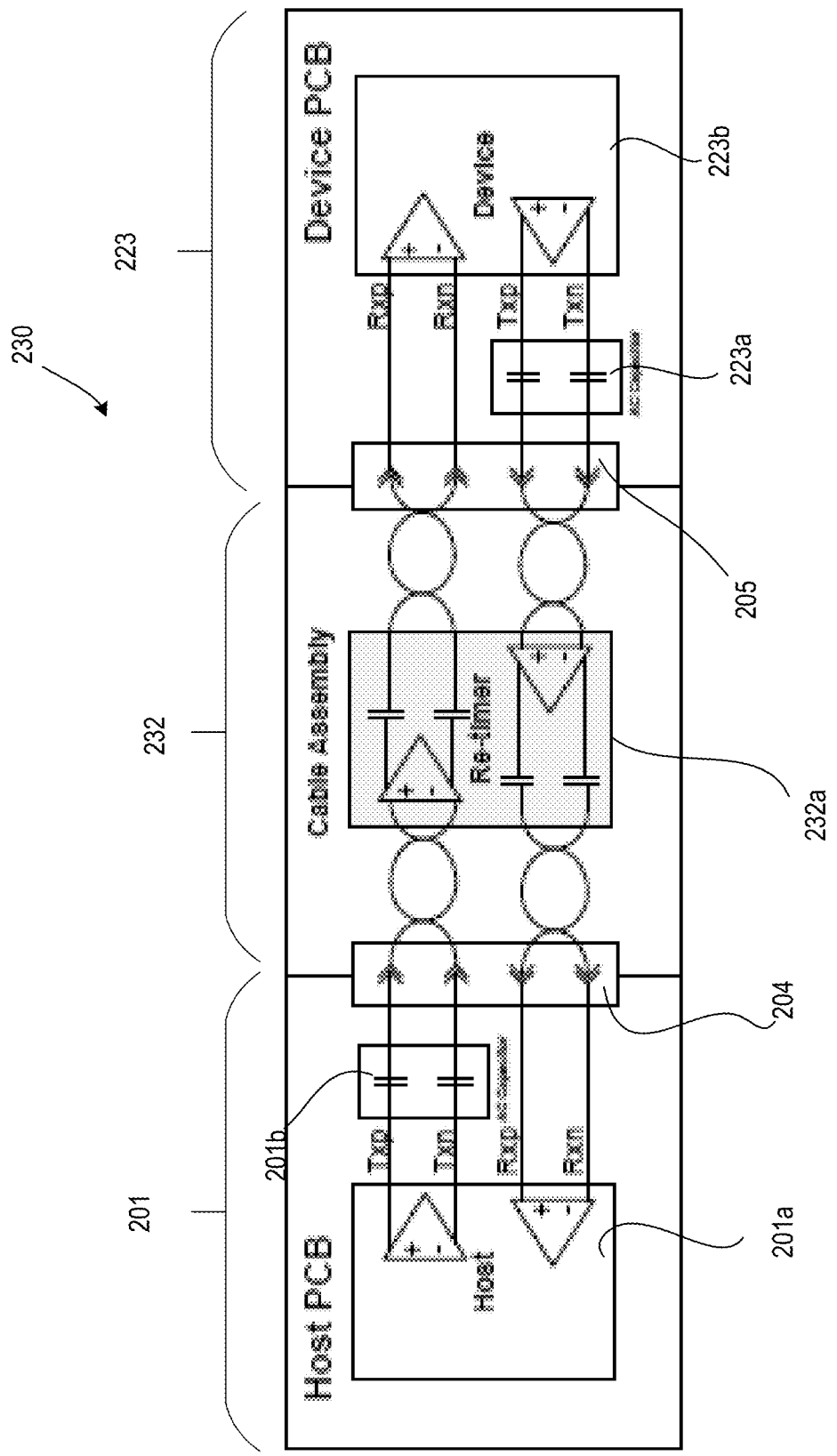
Figure 2D:
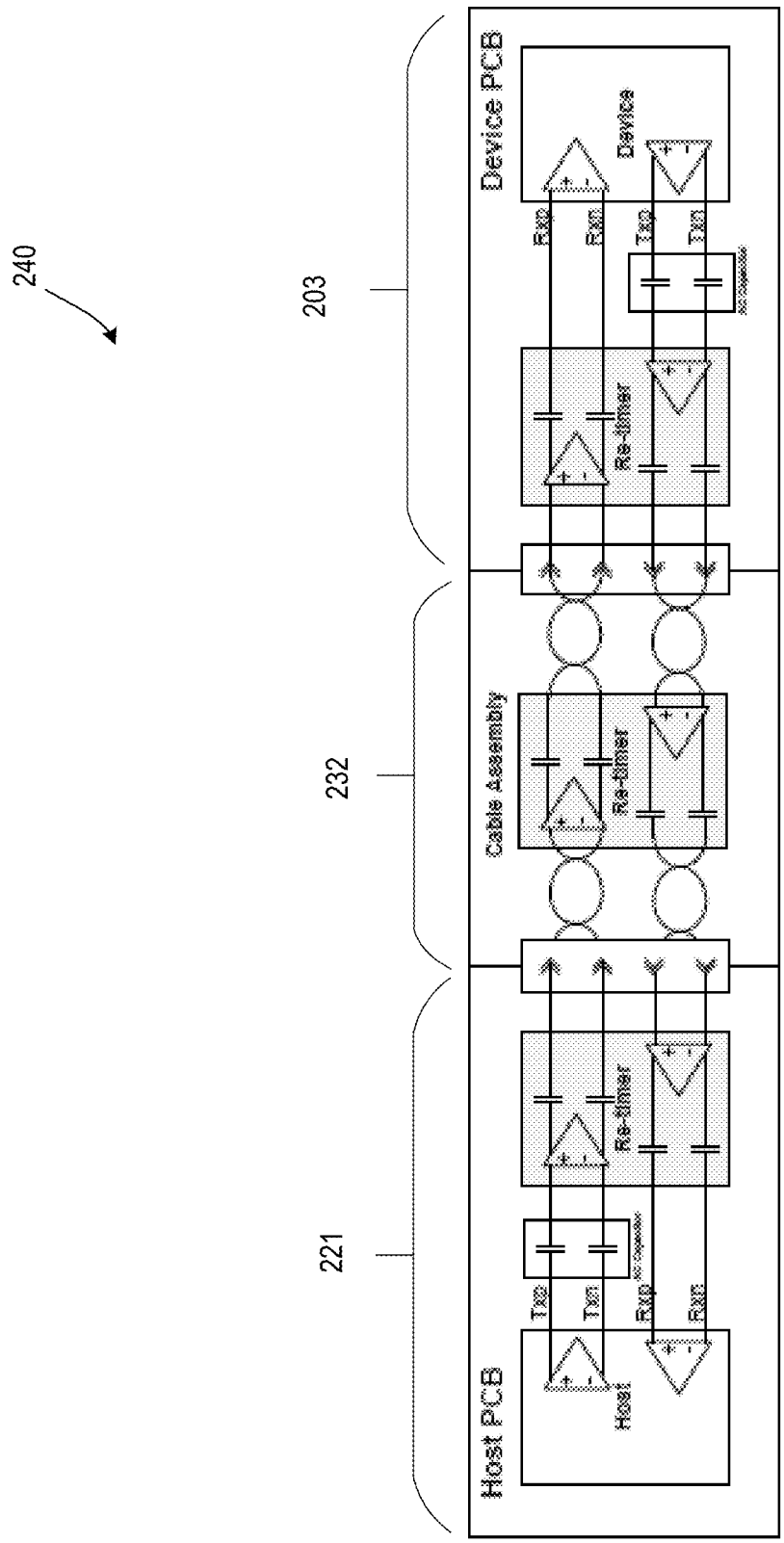

FIG. 2C illustrates usage model 230 where the re-timer is part of a cable assembly, according to some embodiments of the disclosure. In this example, Cable Assembly 232 comprises re-timer 232a which is coupled to interfaces 204 and 205. FIG. 2D illustrates usage model 240 where the re-timer is part of Host PCB 221, Cable Assembly 232, and Device PCB 203, according to some embodiments of the disclosure.

Figure 3:
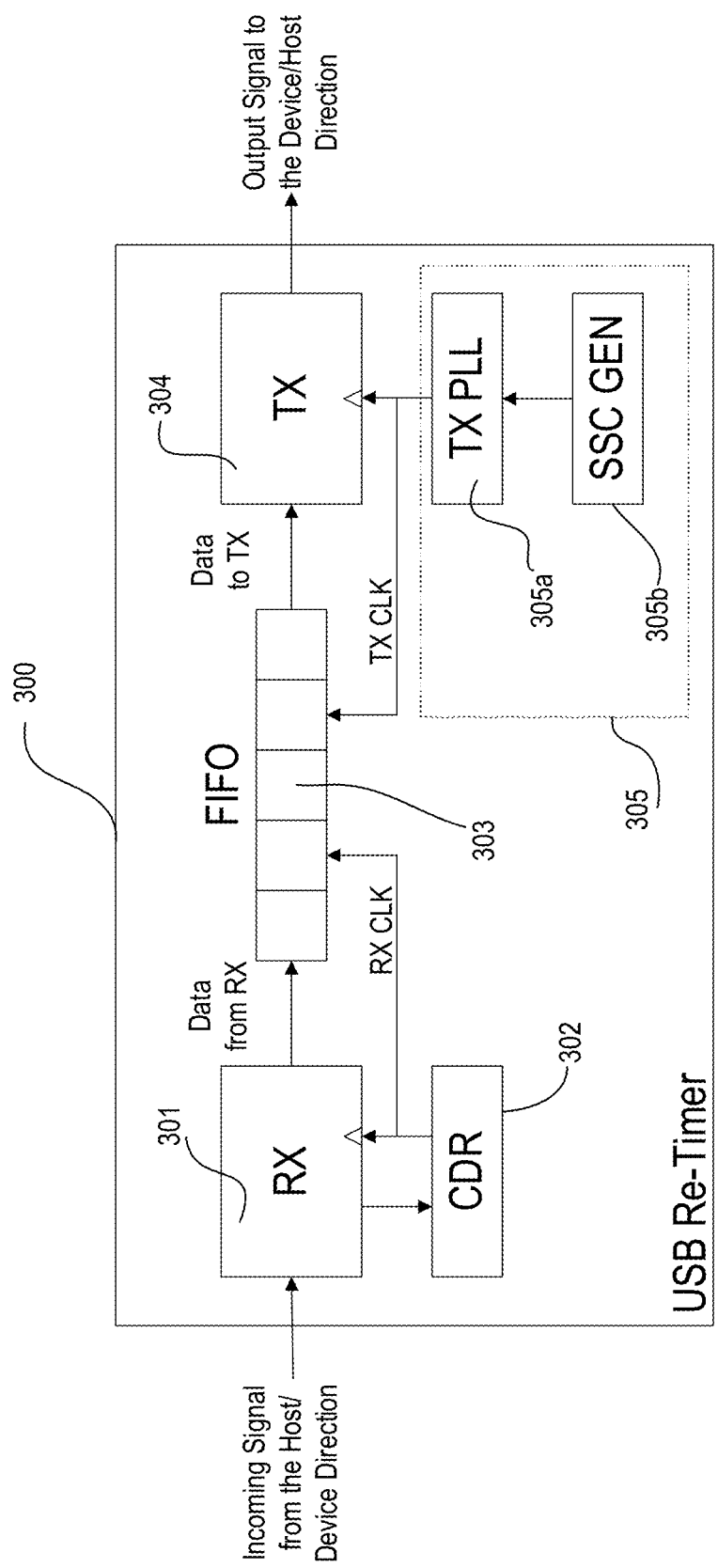
FIG. 3 illustrates a low-latency re-timer, according to some embodiments of the disclosure.

FIG. 3 illustrates low-latency re-timer 300, according to some embodiments of the disclosure. It is pointed out that those elements of FIG. 3 having the same reference numbers (or names) as the elements of any other figure can operate or function in any manner similar to that described, but are not limited to such.

In some embodiments, low-latency re-timer 300 comprises RX 301, CDR circuit 302, FIFO 303, TX 304, and clock synchronizer 305. In some embodiments, clock synchronizer 305 comprises TX PLL 305a and SSC GEN 305b. In some embodiments, RX 301 comprises a de-serializer which receives incoming data from Host Device direction, and de-serializes the incoming data and feeds them into FIFO 303 using RX CLK. Any suitable implementation may be used for realizing the de-serializer of TX 304. For example, a shift-register chain may be used for realizing the de-serializer of TX 304.

In some embodiments, CDR 302 tracks the incoming SSC waveform, and uses any known clock data recovery scheme to generate RX CLK. In some embodiments, SSC GEN 305b generates an SSC waveform for TX PLL 305a, which generates a TX CLK. Any suitable PLL may be used for implementing TX PLL. For example, TX PLL may be an all-digital PLL (ADPLL), LC-PLL (inductor-capacitor PLL), self-biased PLL (SBPLL), etc. TX CLK is used to read data output of FIFO 303, and the data read from FIFO 303 is provided to TX 304. In some embodiments, TX 304 comprises a serializer. Any suitable implementation may be used for realizing the serializer of TX 304. For example, a shift-register chain may be used for realizing the serializer of TX 304. In some embodiments, FIFO 303 may be implemented as a chain of flip-flops such as a shift-register chain.

At the initial phase, the TX CLK is independent of the RX CLK. For example, phase of TX CLK may be separated from a phase of the RX CLK with maximum frequency difference of 5600 ppm. Note, the USB standard specifies the use of independent clocks during wake-up of a re-timer. In some embodiments, in response to waking up from a low power mode or an off state, the tracking loop inside the transmitter SSC GEN 305b starts to track the receiver SSC waveform and slowly aligns to it. In some embodiments, after the alignment completes, the instantaneous frequency difference will be much smaller than before, where the exact number depends on the specific elements of the modulation that may not be tracked. For example, the instantaneous frequency difference is less than 5600 ppm. In some embodiments, the SSC modulation frequency may be tracked as well as the phase of the modulation but the modulation shape (e.g., sinewave, triangle, etc.) may not be fully matched.

In some embodiments, when the two waveforms (e.g., TX CLK and RX CLK) are close enough, it will be possible to switch to the recovered clock for the transmitter as well without causing any glitch in the system (as the two clocks will be almost identical before the switch). This arrangement of various components/circuitries causes the TX CLK to be closely aligned in phase with the RX CLK, and as such, latency of re-timer 300 reduces compared to traditional re-timers.

Figure 4:
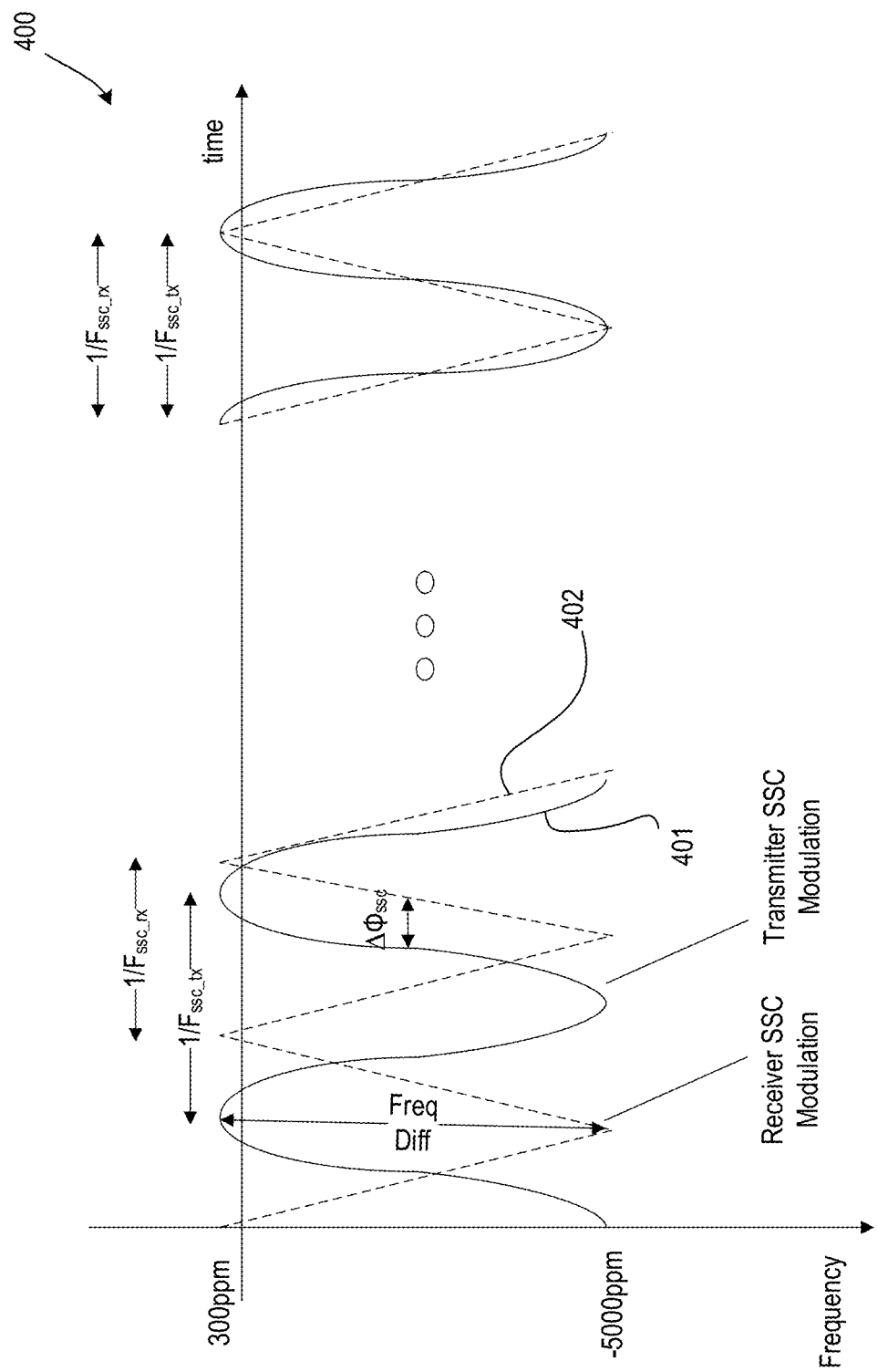
FIG. 4 illustrates a plot showing operation of the low-latency re-timer as it tracks receiver modulation frequency and phase, according to some embodiments.

FIG. 4 illustrates plot 400 showing operation of the low-latency re-timer as it tracks receiver modulation frequency and phase, according to some embodiments. It is pointed out that those elements of FIG. 4 having the same reference numbers (or names) as the elements of any other figure can operate or function in any manner similar to that described, but are not limited to such. Here, x-axis is time and y-axis is frequency in ppm.

The following example illustrates the dynamic behavior of the SSC waveform tracking. Here different SSC modulation waveforms for the receiver side (dotted triangle 402) and transmitter side (solid sine wave 401) in re-timer 300 are shown. At the beginning, the SSC waveforms are different in their shape (e.g., triangle for the RX and sinewave for the TX), frequency (e.g., $1/F_{SSC\_rx}$ vs. $1/F_{SSC\_tx}$), and phase (e.g., $\Delta\phi_{SSC}$) of modulation. After some time, the transmitter SSC GEN 305b tracks the receiver SSC waveform making the modulation frequency and phase aligned while dramatically reducing the instantaneous frequency difference. For example, frequencies $1/F_{SSC\_rx}$ and $1/F_{SSC\_tx}$ become equal and phase difference $\Delta\phi$ between the two waveforms becomes substantially zero. In some embodiments, the shape and also the average frequency shift between the RX and TX SSC modulations, which might cause a small average shift between the SSC curves, can be also tracked.

Figure 5:
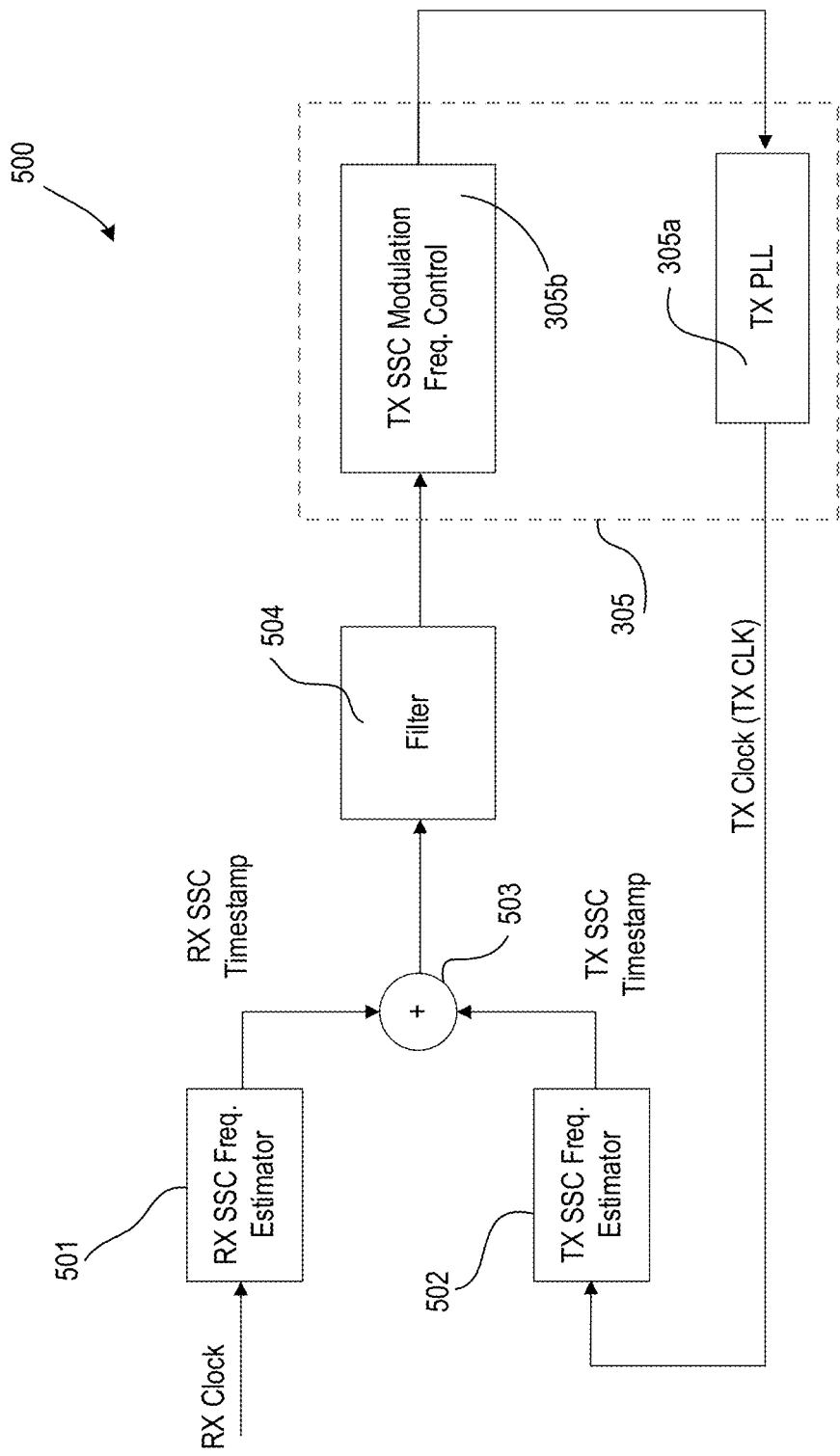
FIG. 5 illustrates a detailed version of the low latency re-timer, according to some embodiments.

FIG. 5 illustrates a detailed version of the low latency re-timer 500, according to some embodiments. It is pointed out that those elements of FIG. 5 having the same reference numbers (or names) as the elements of any other figure can operate or function in any manner similar to that described, but are not limited to such. In some embodiments, the low latency re-timer 500 comprises RX SSC frequency estimator 501, comparator 503 (shown by the "+" sign), filter 504, TX SSC Modulation Frequency Control block 305b and TX PLL 305a of 305, and a TX SSC frequency estimator 502.

In some embodiments, the RX SSC and TX SSC frequency estimators 501 and 502, respectively, are implemented as counters that start counting edges of an incoming clock signal and determine a frequency of that incoming clock signal over a certain time. For example, the instantaneous frequency may be calculated by counting clock transitions in a pre-defined period of time and the reference time instant may be derived based on the estimated frequency. In some embodiments, the input to the RX SSC frequency estimator is RX CLK generated by the CDR 302.

In some embodiments, comparator 503 is a digital comparator that compares RX SSC Timestamp and TX SSC timestamp to determine if there is any difference in the frequencies of the RX CLK and TX CLK. This difference is filtered by filter 504, in accordance with some embodiments. In some embodiments, filter 504 comprises a proportional integral filter.

The tracking of the receiver modulation frequency and phase may be done by applying classical control loop concepts. The information entered to the tracking loop may be the time instant when each of the receiver and transmitter SSC waveforms is reaching a specific point in the modulation profile, which is targeted by the loop to be matched (e.g., the point where the clock frequency is at the maximum per the TX SSC and RX SSC waveforms).

In some embodiments, TX SSC Modulation Frequency Control block 305b modulates the TX CLK and adds SSC on top of it. In some embodiments, the modulated output of TX SSC Modulation Frequency Control block 305b is added to the reference clock of TX PLL 305a. In some embodiments, the modulated output of TX SSC Modulation Frequency Control block 305b is added to an output of the oscillator of TX PLL 305a. In some embodiments, the modulated output of TX SSC Modulation Frequency Control block 305b is added to a divider output of TX PLL 305a (e.g., to the feedback clock signal of the TX PLL 305a).

For aligning the TX SSC modulation phase/frequency to the RX SSC modulation, the TX and RX reference time instants are compared by comparator 503 (shown as "+" sign), and the loop corrects the frequency of the transmitter SSC modulation for closing the gap, until the waveforms match (see FIG. 4 as an example). As soon as the SSC modulation waveforms is close enough, the FIFO delay is reduced. For example, the FIFO delay is reduced from the initial 11.8 ns that is assumed at the beginning to a smaller value that is set adaptively by monitoring the distance between the write and read pointers that is indicating on the maximum frequency difference between them.

Figure 6:
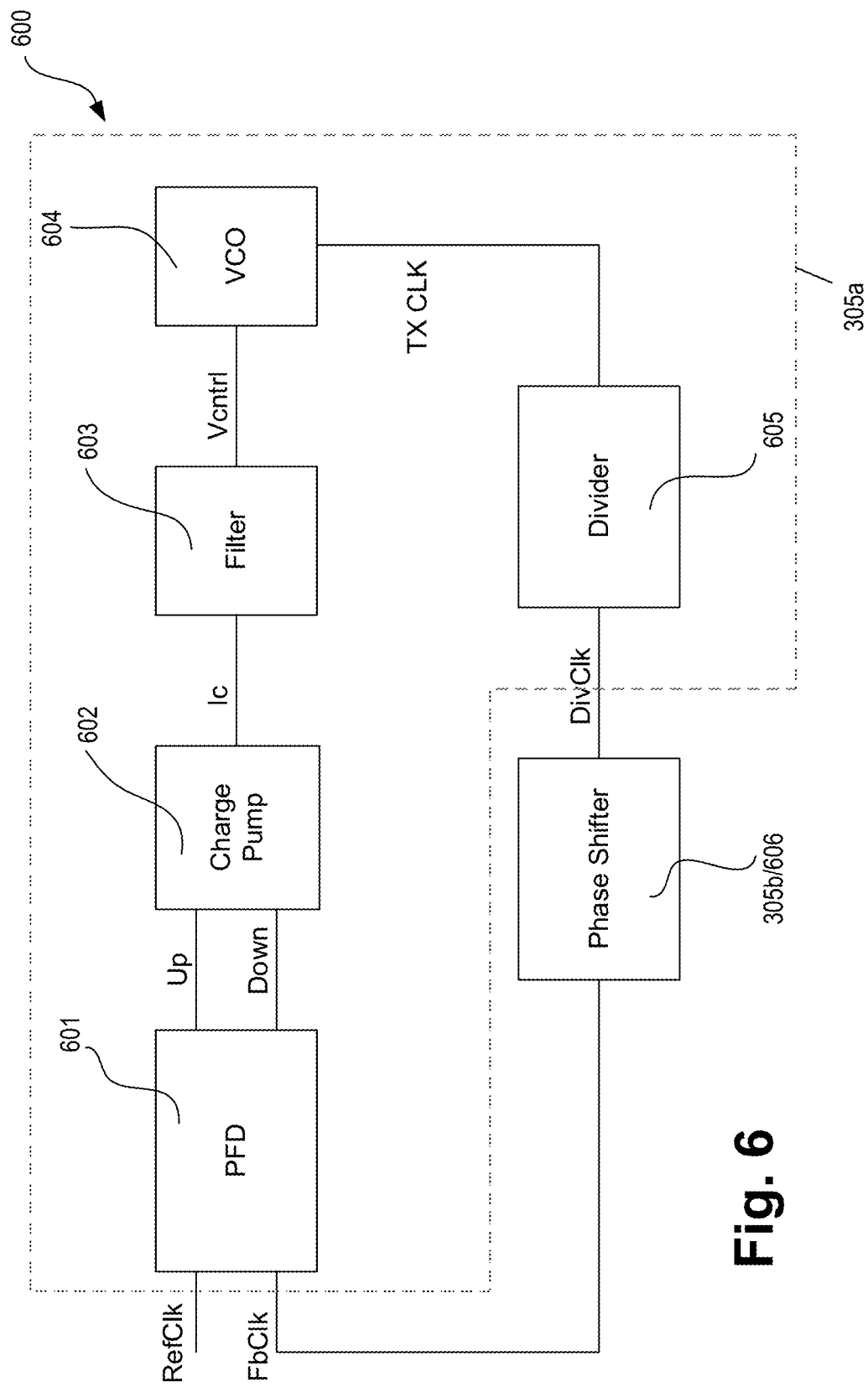
FIG. 6 illustrates an apparatus showing a clock generator and phase shifter of the low latency re-timer, according to some embodiments.

FIG. 6 illustrates apparatus 600 which includes clock generator and phase shifter of the low latency re-timer, according to some embodiments. It is pointed out that those elements of FIG. 6 having the same reference numbers (or names) as the elements of any other figure can operate or function in any manner similar to that described, but are not limited to such.

Apparatus 600 (e.g., 305) comprises TX PLL 305a which includes phase frequency detector (PFD) 601, Charge Pump 602, Filter 603, voltage controlled oscillator (VCO) 604, and Divider 605. Apparatus 600 also includes a phase shifter or interpolator 305b/606. While TX PLL 305a is illustrated as a charge-pump based PLL, other types of PLLs (e.g., all digital PLL) may be used instead. PFD 601 receives a reference clock (RefClk) and a feedback clock (FbClk) and adjusts the phase of the FbClk till it aligns with the RefClk. During that process, PFD 601 generates Up and Down signals for Charge Pump 602, which provides a pump current Ic. This pump current is either positive or negative current depending on the difference in pulse widths of the Up and Down signals. The pump current Ic is filtered and converted into a control voltage Vcntrl by Filter 603. This control voltage is used to change the oscillating frequency of VCO 604. The output of VCO 604 is the TX CLK which is then divided down by Divider 605. The output DivClk of Divider 605 is then received by Phase Shifter 305b/606 which slowly changes the phase of FbClk to introduce spread spectrum to TX CLK.

Figure 7:
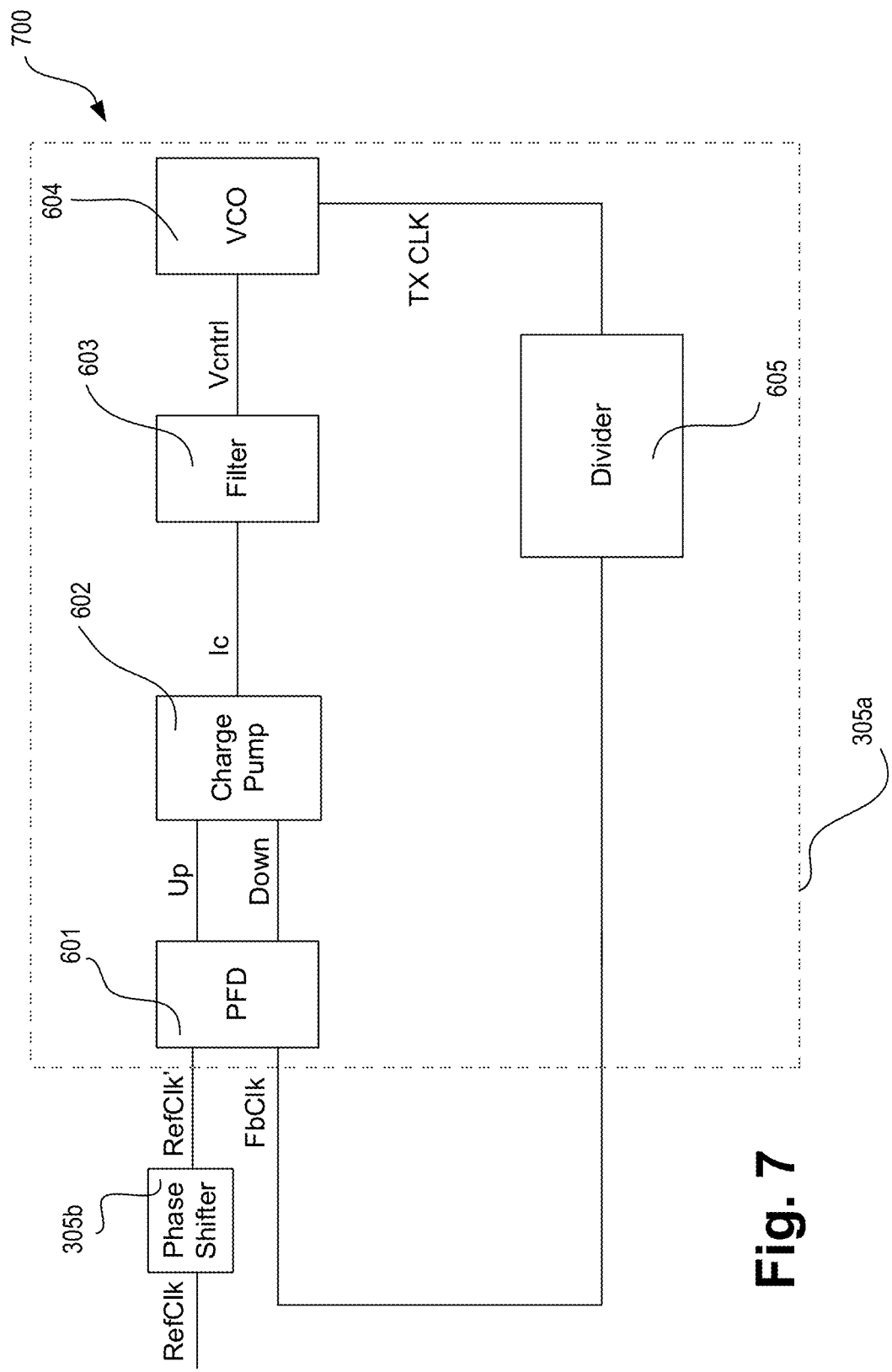
FIG. 7 illustrates another apparatus showing the clock generator and phase shifter of the low latency re-timer, according to some embodiments.

FIG. 7 illustrates apparatus 700 which includes clock generator and phase shifter of the low latency re-timer, according to some embodiments. It is pointed out that those elements of FIG. 7 having the same reference numbers (or names) as the elements of any other figure can operate or function in any manner similar to that described, but are not limited to such. Apparatus 700 is similar to apparatus 600 but for the location of phase shifter 305b. Here, phase shifter 305b is placed in the path of the reference clock (RefClk) and generates a modulated RefClk' that results in spread spectrum on TX CLK. In another embodiment (not shown), phase shifter 305b is added at the output TX CLK of VCO 604 and the input of Divider 605.

Figure 8:
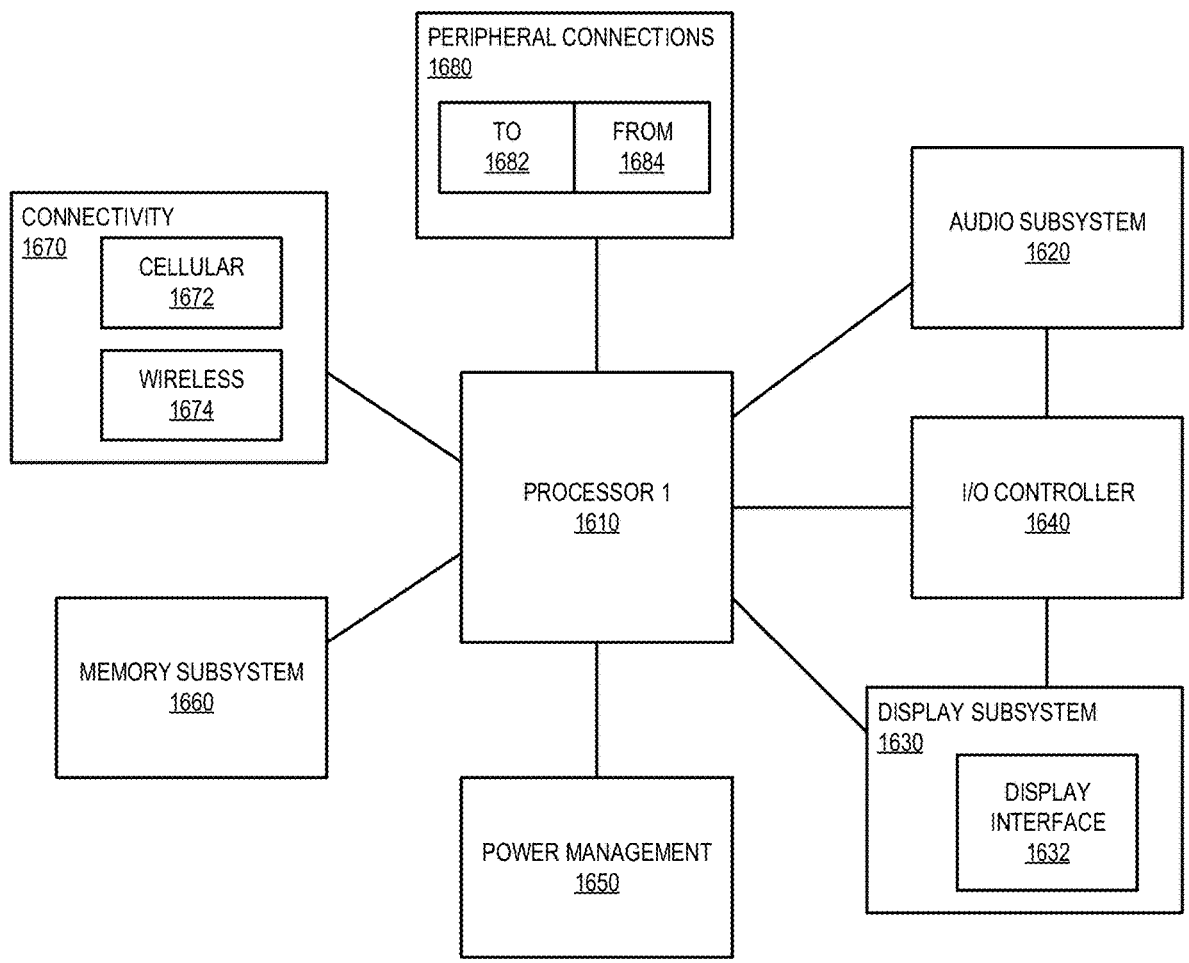
FIG. 8 illustrates a smart device or a computer system or a SoC (System-on-Chip) with one or more low latency re-timers, according to some embodiments of the disclosure.

FIG. 8 illustrates a smart device or a computer system or a SoC (System-on-Chip) with one or more low latency re-timers, according to some embodiments of the disclosure. It is pointed out that those elements of FIG. 8 having the same reference numbers (or names) as the elements of any other figure can operate or function in any manner similar to that described, but are not limited to such.

FIG. 8 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

For purposes of the embodiments, the transistors in various circuits and logic blocks described here are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bipolar junction transistors—BJT PNP/NPN, BiCMOS, CMOS, eFET, etc., may be used without departing from the scope of the disclosure.

In some embodiments, computing device 1600 includes first processor 1610 with a low latency re-timer, according to some embodiments discussed. Other blocks of the computing device 1600 may also include a low latency re-timer, according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Example 1 is an apparatus which comprises: a first clock frequency estimator to estimate a frequency of a receive clock (RX CLK) and to provide a first timestamp associated with a first clock that underwent spread spectrum; a second clock frequency estimator to estimate a frequency of a transmit clock (TX CLK) and to provide a second timestamp associated with a second clock that underwent spread spectrum; and a comparator to compare the first timestamp with the second timestamp.

Example 2 includes all features of example 1, wherein the apparatus of example 2 comprises a filter to receive an output of the comparator.

Example 3 includes all feature of example 2, wherein the apparatus of example 3 comprises a controller to modulate the TX CLK by adding spread spectrum clock on to it.

Example 4 includes all features of example 3, wherein the apparatus of example 4 comprises a phase locked loop (PLL) that is to receive the modulated TX CLK, and is to generate the TX CLK.

Example 5 includes all features of example 1, wherein the apparatus of example 5 comprises: a clock data recovery (CDR) circuit to generate RX CLK from incoming receive data.

Example 6 includes all features of example 1, wherein the apparatus of example 5 comprises a FIFO, where data in the FIFO is entered using the RX CLK and data from the FIFO is read out using the TX CLK.

Example 7 is a system which comprises: a memory; a processor coupled to the memory, wherein the processor is coupled to a first re-timer via an AC coupling capacitor, wherein the first re-timer comprises: a first clock frequency estimator to estimate a frequency of a receive clock (RX CLK) and to provide an RX spread spectrum clock (RX SSC) timestamp; a second clock frequency estimator to estimate a frequency of a transmit clock (TX CLK) and to provide a TX spread spectrum clock (TX SSC) timestamp; and a comparator to compare the RX SSC timestamp with the TX SSC timestamp; and a wireless interface to allow the processor to communicate with another device.

Example 8 includes all features of example 7, wherein the first re-timer is coupled to a cable assembly via a first interface.

Example 9 includes all features of example 8, wherein the cable assembly is coupled to a device a second interface.

Example 10 includes all features of example 8, wherein the cable assembly includes a second re-timer which is coupled to the first interface.

Example 11 includes all features of example 10, wherein the second re-timer is coupled to a device via a second interface.

Example 12 includes all features of example 10, wherein the second re-timer is coupled to a third re-timer via a second interface.

Example 13 includes all features of example 12, wherein the third re-timer is coupled to a device.

Example 14 is an apparatus which comprises: a receiver logic to receive data from a first device; a transmitter logic to send data to a second device; a FIFO coupled to the receiver logic and to the transmitter logic, wherein data from the receiver is to enter the FIFO via a receive clock (RX Clk), and wherein the data from the FIFO is read out by a transmit clock (TX Clk) and is to be sent to the transmitter logic; and circuitry to substantially align a phase of the RX Clk with a phase of the TX Clk.

Example 15 includes all features of example 14, wherein the circuitry comprises: a first clock frequency estimator to estimate a frequency of a receive clock (RX CLK) and to provide an RX spread spectrum clock (RX SSC) timestamp; and a second clock frequency estimator to estimate a frequency of a transmit clock (TX CLK) and to provide a TX spread spectrum clock (TX SSC) timestamp.

Example 16 includes all features of example 15, wherein the circuitry comprises a comparator to compare the RX SSC timestamp with the TX SSC timestamp.

Example 17 includes all features of example 16, wherein the apparatus of example 17 comprises: a filter to receive an output of the comparator; a modulation frequency control unit to modulate the TX CLK by adding spread spectrum clock on to it; and a phase locked loop (PLL) that is to receive the modulated TX CLK from the modulation frequency control unit, and is to generate the TX CLK.

Example 18 includes all features of example 15, wherein at least one of the first or second clock frequency estimator comprises a counter.

Example 19 includes all features of example 14, wherein the receiver logic comprises a de-serializer, and wherein the transmitter logic comprises a serializer.

Example 20 is a method which comprises: estimating a frequency of a receive clock (RX CLK) and providing a first timestamp associated with a first clock that underwent spread spectrum; estimating a frequency of a transmit clock (TX CLK) and providing a second timestamp associated with a second clock that underwent spread spectrum; and comparing the first timestamp with the second timestamp.

Example 21 includes all features of example 20, wherein the method of example 21 comprises: filtering an output of the comparator.

Example 22 includes all features of example 21, wherein the method of example 22 comprises: modulating the TX CLK by adding spread spectrum clock on to it.

Example 23 includes all features of example 22, wherein the method of example 23 comprises generating the TX CLK according to the modulated TX CLK.

Example 24 includes all features of example 21, wherein the method of example 24 comprises generating the RX CLK from incoming receive data.

Example 25 includes all features of example 21, wherein the method of example 21 comprises: queuing data using the RX CLK; and reading data from the FIFO using the TX CLK.

Example 26 is an apparatus which comprises: means for estimating a frequency of a receive clock (RX CLK) and providing a first timestamp associated with a first clock that underwent spread spectrum; means for estimating a frequency of a transmit clock (TX CLK) and providing a second timestamp associated with a second clock that underwent spread spectrum; and means for comparing the first timestamp with the second timestamp.

Example 27 includes all features of example 26, wherein the apparatus of example 27 comprises means for filtering an output of the comparator.

Example 28 includes all features of example 27, wherein the apparatus of example 28 comprises means for modulating the TX CLK by adding spread spectrum clock on to it.

Example 29 includes all features of example 28, wherein the apparatus of example 29 comprises means for generating the TX CLK according to the modulated TX CLK.

Example 30 includes all features of example 26, wherein the apparatus of example 30 comprises means for generating the RX CLK from incoming receive data.

Example 31 includes all features of example 26, wherein the apparatus of example 31 comprises: means for queuing data using the RX CLK; and means for reading data from the FIFO using the TX CLK.

Example 32 is a method which comprises: receiving data from a first device; sending data to a second device; queuing the received data via a receive clock (RX Clk); reading the queued data by a transmit clock (TX Clk); and aligning a phase of the RX Clk with a phase of the TX Clk.

Example 33 includes all features of example 32, wherein the method of example 33 comprises: estimating a frequency of a receive clock (RX CLK) and providing an RX spread spectrum clock (RX SSC) timestamp; and estimating a frequency of a transmit clock (TX CLK) and providing a TX spread spectrum clock (TX SSC) timestamp.

Example 34 includes all features of example 33, wherein the method of example 34 comprises: comparing the RX SSC timestamp with the TX SSC timestamp.

Example 35 includes all features of example 34, wherein the method of example 35 comprises: filtering an output from the comparing; modulating the TX CLK by adding spread spectrum clock on to it; and receiving the modulated TX CLK from the modulation frequency control unit, and is to generate the TX CLK.

Example 36 is an apparatus which comprises: means for receiving data from a first device; means for sending data to a second device; means for queuing the received data via a receive clock (RX Clk); means for reading the queued data by a transmit clock (TX Clk); and means for aligning a phase of the RX Clk with a phase of the TX Clk.

Example 37 includes all features of example 36, wherein the apparatus of example 37 comprises: means for estimating a frequency of a receive clock (RX CLK) and providing an RX spread spectrum clock (RX SSC) timestamp; and means for estimating a frequency of a transmit clock (TX CLK) and providing a TX spread spectrum clock (TX SSC) timestamp.

Example 38 includes all features of example 37, wherein the apparatus of example 38 comprises means for comparing the RX SSC timestamp with the TX SSC timestamp.

Example 39 includes all features of example 34, wherein the apparatus of example 39 comprises: means for filtering an output of the means for comparing; means for modulating the TX CLK by adding spread spectrum clock on to it; and means for receiving the modulated TX CLK from the modulation frequency control unit, and is to generate the TX CLK.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:
1. A cable apparatus comprising:
   a first circuitry to receive data and to de-serialize the data as a first output;

a pipeline comprising two or more registers, wherein the pipeline is coupled to the first circuitry and is to receive the first output, and wherein the pipeline is to provide a second output; and a second circuitry coupled to the pipeline, wherein the second circuitry is to receive the second output and is to serialize the second output as a third output.

2. The cable apparatus of claim 1 comprises:

a first interface to couple to a host device; and a second interface to couple to a client device, wherein the first and second circuitries and the pipeline are between the first and second interfaces.

3. The cable apparatus of claim 1 comprises an AC coupling capacitor coupled to the third output.

4. The cable apparatus of claim 1 comprises a clock data recovery circuitry coupled to the first circuitry, wherein the clock data recovery circuitry is to provide a first clock for the first circuitry and the pipeline.

5. The cable apparatus of claim 4 comprises a phase locked loop (PLL) circuitry coupled to the second circuitry, wherein the PLL circuitry is to provide a second clock for the second circuitry and the pipeline.

6. The cable apparatus of claim 5, wherein the PLL comprises a phase shifter to shift a phase of a reference clock.

7. The cable apparatus of claim 5, wherein the PLL comprises a phase shifter to shift a phase of a feedback clock.

8. The cable apparatus of claim 5, wherein the first or second clocks have spread spectrum.

9. The cable apparatus of claim 4, wherein the first output is stored in at least one of the two or more registers with the first clock.

10. The cable apparatus of claim 5, wherein the second output is retrieved by the second circuitry with the second clock.

11. An apparatus comprising:

a first counter to count a frequency of a first clock and to provide a first count associated with the first clock that underwent spread spectrum;

a second counter to count a frequency of a second clock and to provide a second count associated with the second clock that underwent spread spectrum; and a comparator to compare the first count with the second count.

12. The apparatus of claim 11 comprises a filter coupled to an output of the comparator.

13. The apparatus of claim 12, wherein the filter comprises a proportional integral filter.

14. The apparatus of claim 12 comprises a clock circuitry to receive an output of the filter and to provide the second clock to the second counter.

15. The apparatus of claim 11, wherein the first counter, the second counter, and the comparator are positioned in a cable assembly.

16. The apparatus of claim 11, wherein the first counter, the second counter, and the comparator are positioned on a host printed circuit board.

17. The apparatus of claim 11, wherein the first counter, the second counter, and the comparator are positioned on a client printed circuit board.

18. A system comprising:

a system on chip (SOC) comprising:
 a memory; and
 a processor coupled to the memory;

a retimer coupled to the SOC, wherein the retimer comprises:
 a first circuitry to receive data from the SOC and to de-serialize the data as a first output;
 a pipeline comprising two or more registers, wherein the pipeline is coupled to the first circuitry and is to receive the first output, and wherein the pipeline is to provide a second output; and
 a second circuitry coupled to the pipeline, wherein the second circuitry is to receive the second output and is to serialize the second output as a third output; and a wireless interface to allow the SOC to communicate with another device.

19. The system of claim 18 comprises an AC coupling capacitor coupled to the third output of the retimer.

20. The system of claim 18 comprises:

a clock data recovery circuitry coupled to the first circuitry, wherein the clock data recovery circuitry is to provide a first clock for the first circuitry and the pipeline; and a phase locked loop (PLL) circuitry coupled to the second circuitry, wherein the PLL circuitry is to provide a second clock for the second circuitry and the pipeline.

* * * * *